United States Patent [19]

Maurer

[11] Patent Number: 4,633,744

[45] Date of Patent: Jan. 6, 1987

[54] PUNCH PRESS FOR CUTTING WINDOWS IN A BALL CAGE

[75] Inventor: Martin Maurer, Uttwil, Switzerland

[73] Assignee: Hydrel AG, Romanshorn, Switzerland

[21] Appl. No.: 618,175

[22] Filed: Jun. 7, 1984

[30] Foreign Application Priority Data

Jun. 9, 1983 [CH] Switzerland .................. 3169/83

[51] Int. Cl.[4] .............................................. B26F 1/44
[52] U.S. Cl. ...................................... 83/128; 83/188; 83/267; 83/566
[58] Field of Search .................. 83/188, 191–195, 83/178, 179, 566, 568, 570, 123, 128, 129, 267

[56] References Cited

U.S. PATENT DOCUMENTS

| | | | |
|---|---|---|---|
| 3,022,811 | 2/1962 | Huet | 83/188 X |
| 3,084,580 | 4/1963 | Schmid | 83/123 |
| 3,413,880 | 12/1968 | Foist | 83/191 X |
| 3,440,909 | 4/1969 | Schmid et al. | 83/128 X |
| 3,580,122 | 5/1971 | Powell | 83/128 X |
| 4,205,545 | 6/1980 | Andrews | 72/324 |

FOREIGN PATENT DOCUMENTS

3044028 9/1981 Fed. Rep. of Germany .

Primary Examiner—James M. Meister
Attorney, Agent, or Firm—Blum, Kaplan, Friedman, Silberman & Beran

[57] ABSTRACT

A punch press for cutting windows in a ball cage. The ball cage is held in an established position. A first press assembly includes a first frame member and a punch assembly on a first surface of the cage, for cutting a portion of the cage. A second press assembly includes a second frame member, a cutting bed for supporting a second surface of the cage, said first and second surfaces being opposite surfaces of the cage, around the portion to be cut by the punch assembly. It also includes a counterpunch for opposing the punch assembly on the second surface. Pressure is applied to the second press assembly toward the punch assembly.

6 Claims, 5 Drawing Figures

PUNCH PRESS FOR CUTTING WINDOWS IN A BALL CAGE

BACKGROUND OF THE INVENTION

This invention is generally directed to a punch press and in particular to a punch press for cutting windows in a ball cage.

In synchronized articulations for front wheel-drive cars, the engine torque is transferred by ball joints. These ball joints, usually six, are placed in a ball cage with regularly distributed windows. The windows are rectangularly shaped with very rounded corners. The two longitudinal planes of each window need to be carefully worked because the ball has to be guided axially with little play.

Conventional processing methods for making ball cages involves several steps. First, the blanks must be shaped. Next the inside and outside shapes are turned. The windows are next stamped and the longitudinal planes of the windows are broached. The cage is then case-hardened and the outside shape and longitudinal window planes are made smooth.

The broaching of the longitudinal planes of the window, necessary because of the broken surfaces resulting from the stamping, is an expensive processing step in the manufacturing of ball cages.

Accordingly, there is a need for a device which permits the precision cutting of windows in ball cages, in particular in combination with a triple effect fine blanking press, that obviates the need for the broaching step in the manufacture of ball cages.

SUMMARY OF THE INVENTION

A punch press for cutting windows in cylindrical workpiece such as a ball cage is provided. The press includes an upper member having a holding ring for holding one end of the workpiece and a front carrier displaceable toward the holding ring for holding the opposite end of the workpiece. A cutting punch is positioned within the workpiece and faces downward. A lower member includes a dye having a cutting opening to cooperate with the cutting punch and a counter punch within the cutting opening. When the lower member is raised, the die contacts the workpiece and pushes upper member upward so that a window is cut by the fixed cutting punch and the cut-out debris is forced into the cutting opening. The lower member is lowered to remove the punch from the workpiece and the counterpunch forces the debris from the cutting opening.

It is an object of the invention to provide an improved punch press for cutting windows in a ball cage.

Another object of the invention is to provide an improved punch press for cutting windows in a ball cage which obviates the need for broaching of the longitudinal window planes.

Another object of the invention is to provide an improved punch press for cutting windows in a ball cage which can rapidly and precisely cut all the windows in the cage.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE DRAWINGS

Figure 1:
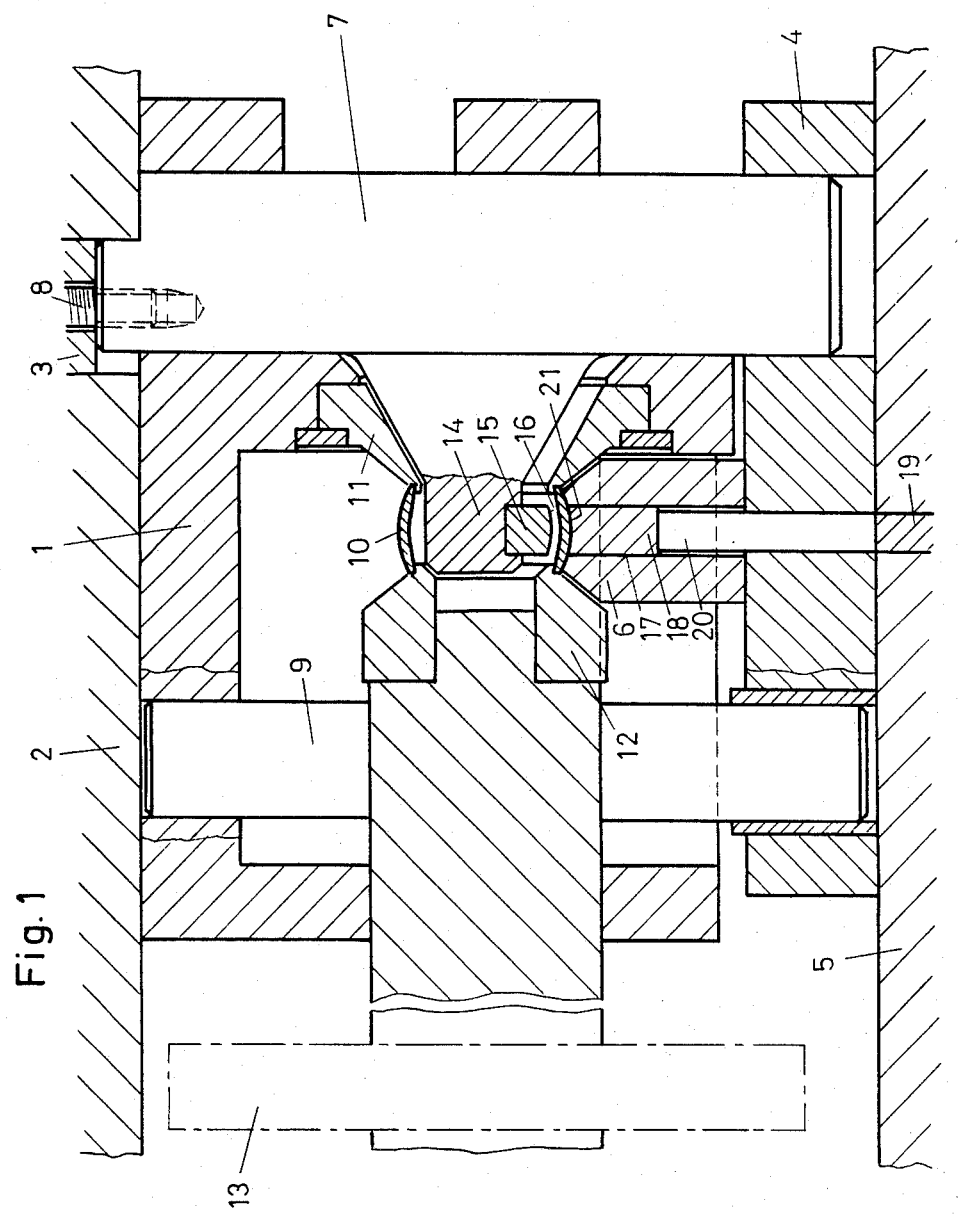
FIG. 1 is a cross-sectional view of a punch press for cutting windows in a ball cage constructed in accordance with the invention.

Reference is first made to FIG. 1 wherein a punch press for cutting windows in a ball cage constructed in accordance with the invention is depicted. The punch press, shown in a simplified version, forms one unit with the basic elements of a hydraulic, triple effect fine blanking press. There are three main groups of components.

The first group of components contains an upper part 1 which is attached to a holding-down table 2, which can, in a press frame 3, be moved straight upward when a force is applied from beneath against a hydraulically generated holding-down pressure.

The second main group of components consists of a lower member 4, which, is attached to a movable press ram 5 which carries a die 6.

The third group of components contains a punch holder 7 which is detachably connected to press frame 3 by means of screws 8 (one screw is shown).

Upper member 1 is axially guided vis-a-vis lower part 4 by means of guideposts 9 (one post is shown). Punch holder 7 is constrained by upper member 1 and lower member 4 so that it can only move vertically and can not rotate. This configuration allows for the vertical movement of upper member 1 with respect to lower member 4 and upper member 1 and lower member 4 with reference to punch holder 7.

A ball cage 10 to be processed, shown in cross-section, is clamped in upper member 1. To securely clamp ball cage 10 upper member 1 has a holding ring 11, on the right side (FIG. 1), mounted so that it can rotate. On the left side (FIG. 1) upper member 1 is equipped with a horizontal frontal carrier 12 which can rotate and slide horizontally (FIG. 1) along its axis. A hydraulic drive (not shown) is used to axially slide frontal carrier 12.

As a result of holding ring 11 and frontal carrier 12, ball cage 10 is securely clamped, and axially and radially centered between holding ring 11 and frontal carrier 12. An index drive 13 can be used to turn ball cage 10, while axially clamped in position. This permits ball cage 10 to be rotated into the next position for punching without removal of cage 10. In this way ball cage 10 can have all of the windows punched according to a window spacing layout without removal from the press.

Punch holder 7 has a horizontal extension arm 14 on which a cutting punch 15 is mounted. Cutting punch 15 is inside ball cage 10 und its cutting plane 16 points downward in the direction of the nearest inner surface of ball cage 10.

Die 6 has a cutting opening 17 in which a counterpunch 18, corresponding in shape to cutting punch 15 is mounted so it can slide. Counterpunch 18 is subjected to a counter-force, which is generated by a hydraulically operating pressure cushion 19 built into press ram 5. The counter-force is transferred to counterpunch 18 by a set bolt 20.

Die 6 and counterpunch 18 jointly form a spherical segment 21. The inside diameter of spherical segment 21 corresponds to the outside diameter of ball cage 10. In a like manner cutting plane 16 of cutting punch 15 corresponds in shape to the inside of ball cage 10.

Reference is next made to FIGS. 2 through 5 which show the punch press of FIG. 1 in various stages of the process of punching windows in a ball cage. FIGS. 2-5 only show the portion of the punch press directly surrounding ball cage 10.

Figure 2:
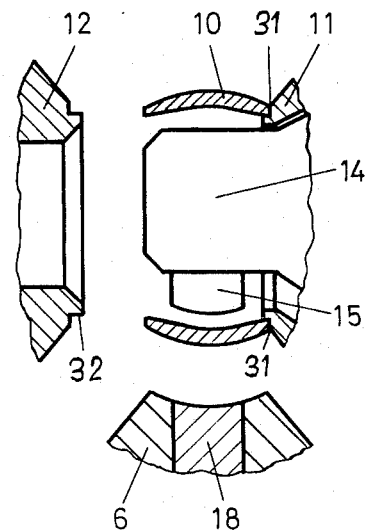
FIG. 2 is a partial and expanded cross-sectional view of the punch press of FIG. 1 in its opened state.

FIG. 2 shows the positioning of the punch press when the press is open, i.e. press plunger 5 is in its lowered position resulting in dye 6 and counterpunch 18 being separated from cage 10. Die 6 is below the cutting point. Frontal carrier 12 is in its farthest left position (FIG. 2). With frontal carrier 12 and die 6 in their open position, cage 10 can be placed in the press, either by hand or with an insertion device. Ball cage 10 fits into a groove 31 in holding ring 11. Ball cage 10 is then tightly positioned by hydraulically movihg frontal carrier 12 to the right (FIG. 2), until groove 32 of frontal carrier 12 firmly grips ball cage 10. Ball cage 10 is tightly positioned with extension arm 14 and cutting punch 15 located within cage 10.

Figure 3:
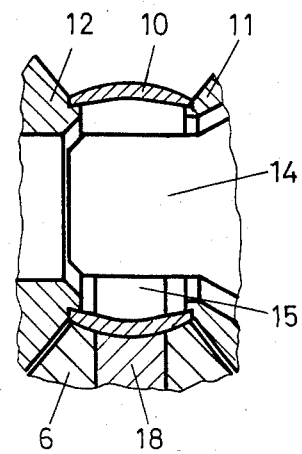
FIG. 3 is a partial and expanded cross-sectional view of the punch press of FIG. 1 with the punch and counterpunch contacting the ball cage.

The press is now closed by raising press ram 5 (FIG. 1), so that die 6, as shown in FIG. 3, will also move upward. When this is done die 6 pushes upward against ball cage 10, holding ring 11 and frontal carrier 12. The upward force is transferred to upper members 1· and holding-down table 2 (FIG. 1) which also move upward, against the adjusted hydraulic holdingdown pressure until the inside of ball cage 10 is proximate to cutting punch 15. This results, in the section of ball cage 10 in the area where the window is to be cut being clamped between cutting punch 15 and counterpunch 18. Counterpunch 18 is pushed upward by the counter-pressure applied from below it.

Figure 4:
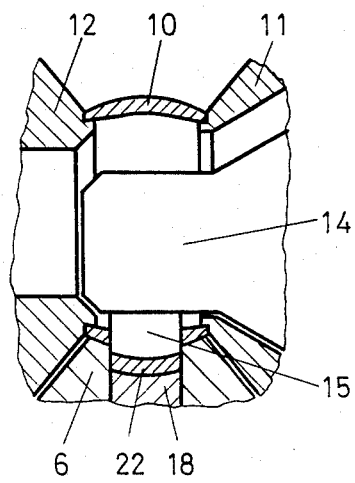
FIG. 4 is a partial and expanded cross-sectional view of the punch press of FIG. 1 after a window has been punched out of the ball cage.

As soon as the closing force of the press, i.e. of press ram 5 reaches the sum of the holding-down force of holding-down table 2, the counter-force of counterpunch 18 and the cutting resistance on the cutting plane 16 of cutting punch 15, the cutting process begins. With a continuous upward movement of press ram 5 (FIG. 1), die 6 pushes ball cage 10 upward against cutting punch 15, while holding-down table 2 (FIG. 1) moves further upward. After cutting punch 15 has penetrated the wall of ball cage 10, it pushes a window cut out debris 22 into counterpunch 18 in die 6, as shown in FIG. 4. A stop (not shown) in the press restricts the upward movement of press ram 5 and thus, of die 6, after the cut has been completed.

Figure 5:
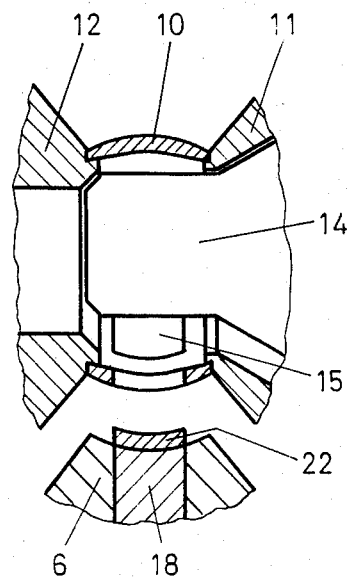
FIG. 5 is a partial and expanded cross-sectional view of the punch press of FIG. 1 after the window has been punched and the press is opened for removal of the window-cut debris.

Next, the press is opened, with press ram 5, (FIG. 1) moving downward so that die 6 will move downward, as shown in FIG. 5. Also, holding-down table 2, which is under hydraulic pressure, will move, downward along with holding ring 11 and frontal carrier 12. As a result ball cage 10 moves away from cutting punch 15 which returns to the interior of cage 10. Counterpunch 18 pushes debris 22 from die 6 with its hydraulic counter-pressure. At this point debris 22 is blown sideways out of the press using, for example, a compressed air device (not shown). Index drive 13 (FIG. 1) is now able to turn ball cage 10 into position for cutting the next window.

Accordingly, the punch press constructed in accordance with the invention allows for the punching of windows in ball cages, particularly those used for synchronized articulation, without broken surfaces, thereby avoiding the need for the complicated and expensive process of broaching the longitudinal planes of the window. The punch press can be easily incorporated in a triple effect fine blanking press and, in addition, permits the fully automated sequential fine blanking of windows in a large number of ball cages.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A punch press for cutting windows in cylindrical workpieces, comprising:
   a fixed press member having an arm with a free end extending therefrom;
   a cutting punch mounted on the arm at the free end and facing downward;
   an upper press member adapted to be displaced vertically with respect to the fixed member, the upper member having holding means for securing the cylindrical workpiece about the cutting punch within the press;
   a lower press member adapted to be dispaced vertically with respect to the upper member and the fixed member, the lower member having a die formed with a cutting opening for cooperating with the cutting punch;
   the die formed with a portion directly engaging the holding means and the workpiece to displace the holding means and workpiece upwardly;
   a counter-punch within the cutting opening and displaceable therein with respect to the die, the counter-punch being displaceably mounted on the lower press member; and
   wherein the lower member is displaced towards the workpiece to contact the outer surface, the upper and lower members are displaced upward with respect to the cutting punch to cut the window in the workpiece, the cutting punch and cut piece from the workpiece being forced into the cutting opening and displacing the counter-punch downward with respect to the lower member.

2. The punch press of claim 1, wherein the lower member includes hydraulic pressure means against which the counter-punch is displaced when the cutting punch enters the cutting opening, the hydraulic pressure means displacing the counter-punch upwardly when the lower member is displaced downward with respect to the cutting punch.

3. The punch press of claim 1, wherein the cylindrical workpieces are ball cages for synchronized articulations.

4. A punch press for cutting windows in cylindrical workpieces, comprising:

a fixed press member having an arm with a free end extending therefrom;

a cutting punch mounted on the arm at the free end and facing downward;

an upper press member adapted to be displaced vertically with respect to the fixed member, the upper member having holding means for securing the cylindrical workpiece about the cutting punch within the press, the holding means including a first holding ring mounted on the upper member about the arm proximate the free end thereof for receiving a first end of the cylindrical workpiece and a second holding ring mounted on the upper member coaxially with the first holding ring and spaced therefrom for receiving the other end of the cylindrical workpiece, the second holding ring being displaceable towards the first holding ring for securing the workpiece between the two holding rings in the press and in position to be cut by the cutting punch;

a lower press member adapted to be displaced vertically with respect to the upper member and the fixed member, the lower member having a die formed with a cutting opening for cooperating with the cutting punch;

a counter-punch within the cutting opening and displaceable therein with respect to the die, the counterpunch being displaceably mounted on the lower press member; and wherein the lower member is displaced towards the workpiece to contact the outer surface, the upper and lower members are displaced upward with respect to the cutting punch to cut the window in the workpiece, the cutting punch and cut piece from the workpiece being forced into the cutting opening and displacing the counter-punch downward with respect to the lower member.

5. The punch press of claim 4, wherein the first holding ring is rotatably mounted on the upper member and the upper member further includes a carrier having a front end, the carrier being displaceable towards the first holding ring, the second holding ring mounted on the front end of the carrier, the carrier and second holding ring being adapted to rotate the workpiece about the cutting punch.

6. The punch press of claim 5, wherein the carrier further includes index drive means for rotating the cylindrical workpiece.

* * * * *